United States Patent Office 2,725,592
Patented Dec. 6, 1955

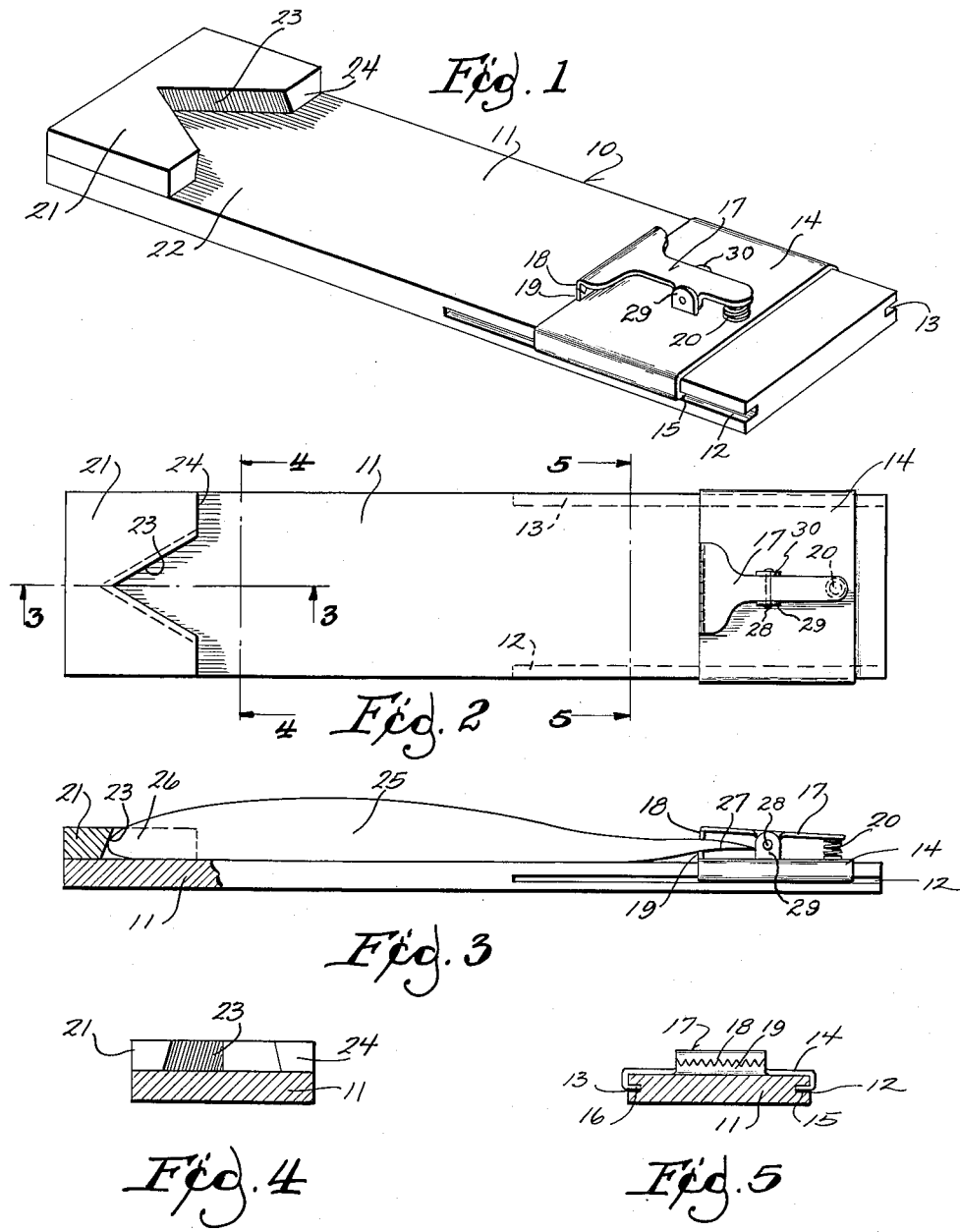

2,725,592
FISH SCALING BOARDS

George E. Pieper, Milwaukee, Wis.

Application September 30, 1952, Serial No. 312,230

2 Claims. (Cl. 17—8)

This invention relates to improvements in fish scaling boards, and more particularly to a novel fish scaling board of the type having adjustable means for securing various sized fish.

An object of the invention is to provide a device of the type having a tail clamp longitudinally adjustable on the board for use in scaling fish of different size.

Another object of the invention is to provide a simple board having a fish head retainer of simple design adapted for use with a novel adjustable fish tail clamp.

Other and further objects of the invention will appear as the description proceeds, reference being had to the accompanying drawings, in which:

Fig. 1 is a view in perspective from above of a fish scaling board embodying the invention.

Fig. 2 is a plan view of the same.

Fig. 3 is a side view partly in elevation and partly in section showing a fish on the board in position for scaling.

Fig. 4 is a sectional view taken on line 4—4 of Fig. 2.

Fig. 5 is a view taken on line 5—5 of Fig. 2.

Referring more particularly to the drawings, the numeral 10 refers to the device generally, including an elongated rectangular base board 11, having a pair of side edge grooves 12 and 13 for a portion of its length. A slide member 14 has the inturned flanges 15 and 16 held in the grooves 12 and 13 and carries the spring clamp 17 provided with the toothed jaws 18 and 19 normally held in closed position by the spring 20. The toothed jaw 19 is formed by an upturned flange of the slide member 14, the flange being perpendicular to the grooved sides of the board 11 and positioned on the edge of the member 14 nearest to a head piece 21. The jaw 18 is pivoted about a shaft 28 secured between two upturned flanges 29 and 30 integral with the slide member 14 and parallel to the grooved sides of the member 11. Thus the pivot supports for the upper jaw 18 and the lower jaw 19 of the clamp 17 are integral with and formed from the slide member 14.

A head piece 21 is fixed on the top side 22 of the board 11 and has a tapered V cut-out at 23 of the inner edge 24 thereof.

The inturned flanges 15 and 16 are so constructed that they have a gripping spring tension within the edge grooves 12 and 13 thereby positively retaining the slide member 14 in position during a scaling operation but allowing it to be moved to adapt the scaling board of the present invention to accommodate different length fish.

In use, a fish 25 is placed flat on the board 11 with its head 26 held within the tapered V cut-out at 23 which has its largest dimension at the point of contact with the board 11. The spring clamp 17 is engaged with the tail 27 of the fish 25, and said clamp 17 may be moved longitudinally of the board 11 within the grooves 12 and 13.

It will be understood that the device is capable of many modifications in structure and design, without departing from the spirit of the invention, within the scope of the appended claims.

Having thus described the invention, what is claimed and desired to be secured by Letters Patent of the United States, is:

1. A fish scaling board comprising a flat elongated rectangular plate member, a relatively short flat member disposed on the upper surface of one end of said plate member, said flat member having a transversely tapered V-recess directed toward said one end of said plate member, said V-recess being tapered downwardly toward said one end, the elongated sides of said plate member having longitudinally extending grooves, and a tail clamping member including a flat plate member disposed on the upper surface of the other end of said flat member, side members integral with and depending downwardly from said flat plate member and having inturned resilient flanges positioned in said grooves in the sides of said flat member, said resilient flanges providing a spring gripping action thereby positively retaining said tail clamping member in any desired position and a clamp means secured to the upper surface of said flat plate member for clamping the tail of a fish to be scaled.

2. The combination according to claim 1 wherein said clamp means comprises an upturned flange integral with the edge of said flat plate member opposed to said flat member, said flange forming a lower jaw of said clamping means, an upper jaw of said clamping means including a flat elongated member having a downturned flange, two upturned flanges integral with said flat plate member and parallel to said elongated sides of said flat member, said flat elongated member being centrally pivotally mounted between said two flanges and spring means for biasing said upper jaw into engagement with said lower jaw.

References Cited in the file of this patent

UNITED STATES PATENTS

| | | |
|---|---|---|
| 867,182 | Bahde | Sept. 24, 1907 |
| 1,438,091 | Bowe | Dec. 5, 1922 |
| 1,632,194 | Possehl | June 14, 1927 |
| 2,110,341 | Rindt | Mar. 8, 1938 |
| 2,607,070 | Wertz et al. | Aug. 19, 1952 |